United States Patent
Kalekar et al.

(10) Patent No.: US 12,182,213 B2
(45) Date of Patent: Dec. 31, 2024

(54) AUTOMATED USER LANGUAGE DETECTION FOR CONTENT SELECTION

(71) Applicant: GOOGLE LLC, Mountain View, CA (US)

(72) Inventors: Prajakta Kalekar, Mountain View, CA (US); Yiding Liu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/623,707

(22) PCT Filed: Sep. 14, 2020

(86) PCT No.: PCT/US2020/050671
§ 371 (c)(1),
(2) Date: Dec. 29, 2021

(87) PCT Pub. No.: WO2022/055506
PCT Pub. Date: Mar. 17, 2022

(65) Prior Publication Data
US 2022/0350851 A1    Nov. 3, 2022

(51) Int. Cl.
*G06F 16/9535*    (2019.01)
(52) U.S. Cl.
CPC ................ *G06F 16/9535* (2019.01)
(58) Field of Classification Search
CPC .................... G06F 16/9535; G06F 16/337
See application file for complete search history.

(56) References Cited

U.S. PATENT DOCUMENTS 8,375,025 B1    2/2013  Datar et al.
9,275,113 B1 *  3/2016  Datar ................... G06F 16/951
(Continued)

FOREIGN PATENT DOCUMENTS

CN    110998717 A    4/2020

OTHER PUBLICATIONS

International Search Report and Written Opinion in International Application No. PCT/US2020/050671 dated Jan. 26, 2021, 12 pages.
(Continued)

*Primary Examiner* — Mariela Reyes
*Assistant Examiner* — Fatima P Mina
(74) *Attorney, Agent, or Firm* — MARSHALL, GERSTEIN & BORUN LLP

(57) ABSTRACT

Systems and methods of determining languages of users in networked environments are provided herein. A data processing system having one or more processors coupled with memory can receive, from a client device, a request for content identifying an account profile. The data processing system can determine, using a log record identifying activities of the account profile, a first set of candidate languages. The data processing system can identify a plurality of information resources to be presented in accordance with a ranking. The data processing system can determine a second set of candidate languages from the plurality of languages based on content in each information resource and a corresponding ranking of each information resource. The data processing system can identify a set of languages included in both the first set of candidate languages and the second set of candidate languages.

22 Claims, 8 Drawing Sheets

(56) References Cited

U.S. PATENT DOCUMENTS

| | | | |
|---|---|---|---|
| 11,507,742 B1* | 11/2022 | Lin | H04L 63/1425 |
| 2015/0347378 A1 | 12/2015 | Poiesz et al. | |
| 2018/0095624 A1* | 4/2018 | Osman | G06T 19/006 |
| 2018/0107636 A1* | 4/2018 | Huang | G06F 40/166 |
| 2018/0366110 A1* | 12/2018 | Hashem | G10L 15/32 |
| 2019/0318735 A1 | 10/2019 | Chao et al. | |
| 2021/0004440 A1* | 1/2021 | Purnell | G06N 7/01 |

OTHER PUBLICATIONS

First Office Action for Chinese Application No. 202080097492.4, dated Sep. 2, 2024.

\* cited by examiner

AUTOMATED USER LANGUAGE DETECTION FOR CONTENT SELECTION

CROSS-REFERENCE TO RELATED APPLICATIONS

The present application is a National Stage Application, filed under 35 U.S.C. 371, of International Patent Application No. PCT/US20/50671 filed on Sep. 14, 2020, titled "AUTOMATED USER LANGUAGE DETECTION FOR CONTENT SELECTION," the entirety of which is incorporated by reference herein.

BACKGROUND

In computer networked environments such as the Internet, content providers can provide content items to be inserted into an information resource (e.g., a webpage) processed and rendered by an application (e.g., a web browser) executing on a client device.

SUMMARY

At least one aspect is directed to systems and methods for automatically detecting user language for content selection. A data processing system having one or more processors coupled with memory can receive, from a client device, a request for content identifying an account profile. The data processing system can determine, using a log record identifying a plurality of activities of the account profile, a first set of candidate languages from a plurality of languages. The data processing system can identify, in response to the request for content, a plurality of information resources to be presented to the client device in accordance with a ranking. The data processing system can a second set of candidate languages from the plurality of languages based on content in each information resource and a corresponding ranking of each information resource. The data processing system can identify a set of languages included in both the first set of candidate languages and the second set of candidate languages, the set of languages including a first language and a second language from the plurality of the languages. The data processing system can store, in one or more data structures, an association among the account profile, the first language, and the second language.

In some implementations, the data processing system can generate a first confidence score for the first language based on a first number of occurrences of the first language in at least one of the plurality of activities or the plurality of information resources identified in response to the request for content. In some implementations, the data processing system can generate a second confidence score for the second language based on a second number of occurrences of the second language in at least one of the plurality of activities or the plurality of information resources identified in response to the request for content.

In some implementations, the data processing system can include the first language into the first set of candidate languages responsive to determining that a first confidence score for the first language is greater than a threshold score. In some implementations, the data processing system can include the second language into the second set of candidate languages responsive to determining that a second confidence score for the second language is greater than the threshold score.

In some implementations, the data processing system can identify a first plurality of content items in the first language and a second plurality of content items in the second language. In some implementations, the data processing system can provide, to the client device, a content item selected from one of the first plurality of content items and the second plurality of content items, the content item in one of the first language or the second language.

In some implementations, the data processing system can identify a selection value for each content item of a first plurality of content items in the first language and a second plurality of content items in the second language. In some implementations, the data processing system can select, from the first plurality of content items and the second plurality of content items, a content item to provide to the client device in accordance to a content selection protocol, the content item in one of the first language or the second language.

In some implementations, the data processing system can identify an information resource associated with a content item in the first language or the second language. In some implementations, the data processing system can determine that a language of the content item corresponds to a language of the information resource. In some implementations, the data processing system can add, responsive to determining that the language of the content item corresponds to the language of the information resource, the content item to a plurality of candidate content items to select from for the client device.

In some implementations, the data processing system can identify a third set of candidate languages from at least one of a language setting of the account profile, a language configuration of an application executing on the client device, or one or more keywords included in the request for content. In some implementations, the data processing system can identify the set of languages included in the first set of candidate languages, the second set of candidate languages, and third set of candidate languages.

In some implementations, the data processing system can determine, from the plurality of languages based on the plurality of activities identified in the log record, the plurality of activities including at least one of: a search query received from the client device, accessing of an information resource by the client device, and an interaction with an element on the information resource. In some implementations, the data processing system can determine, from the plurality of languages based on a frequency of each language of the second set of candidate languages across the plurality of information resources identified in response to the request for content.

In some implementations, the data processing system can receive, from the client device, a query including one or more keywords. In some implementations, the data processing system can perform a search operation using the one or more keywords of the query to identify the plurality of information resources. In some implementations, the data processing system can provide an output including at least one of the plurality of information resources and a content item selected from one of a first plurality of content items in the first language and the second plurality of content items in the second language, the content item in one of the first language or the second language These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
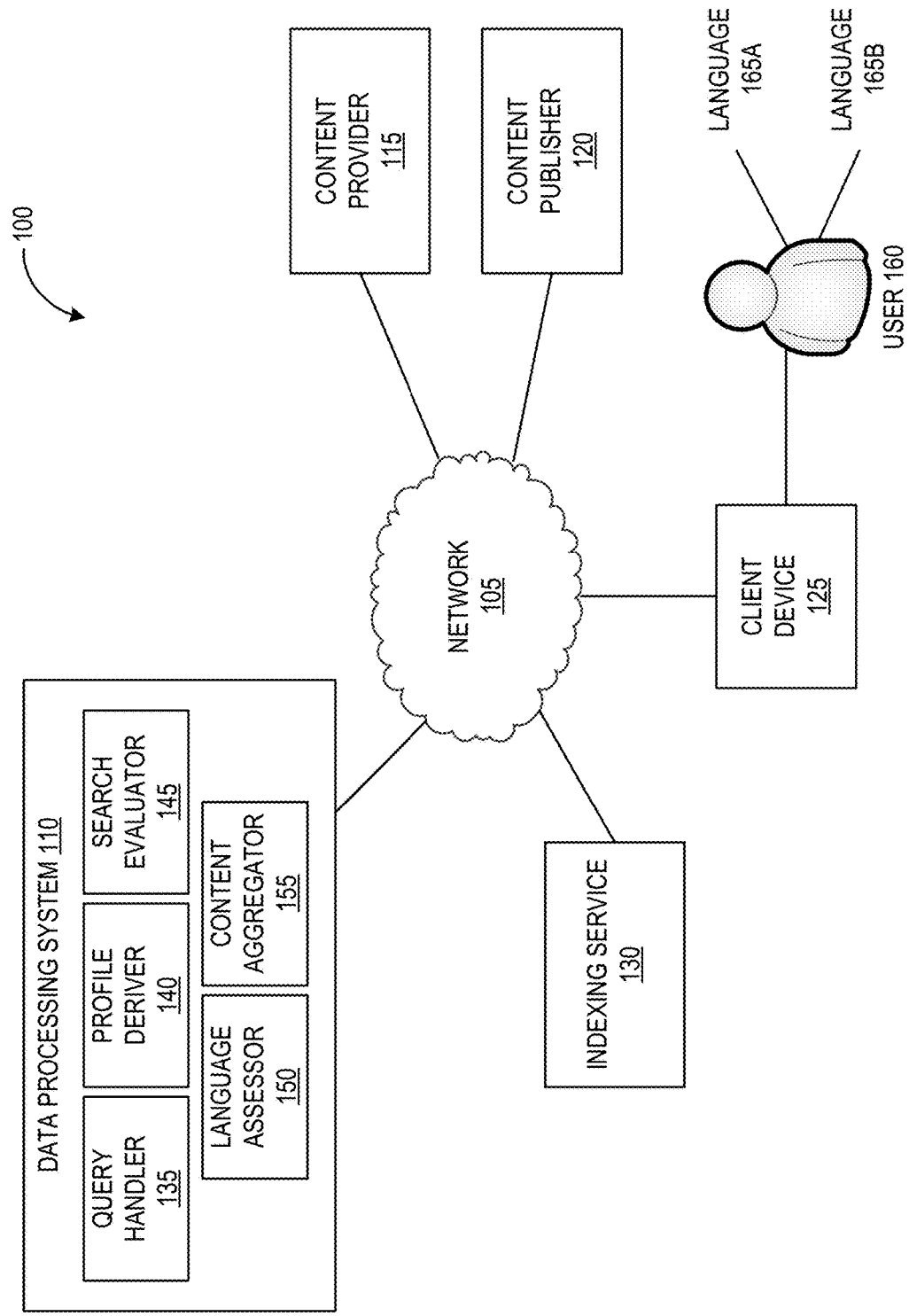
FIG. 1 is a block diagram of a system for automatically detecting user language for content selection in accordance with an illustrative embodiment.

Following below are more detailed descriptions of various concepts related to, and implementations of, methods, apparatuses, and systems of determining languages of users in networked environments. The various concepts introduced above and discussed in greater detail below may be implemented in any of numerous ways, as the described concepts are not limited to any particular manner of implementation.

A centralized service of a content distribution platform can select content items from various content providers to send to client devices using any number of selection parameters. Each of the content items may have been configured to present audio, video, or textual content in one particular language (e.g., English). The selection parameters for each content item may be set by the respective content provider to define that the content item is to be provided to a client device when associated with a specific language identifier. When a request for content or query is received from a client device, the service can identify the language that the user of the client device uses. The language can be identified from on a language setting from an account associated with the user, a language configuration of an application (e.g., a web browser) on the client device, or from the text of the query itself. With this identification, the service can select and provide one of the content items with content in the same language as the one identified for the client device in response to the request. For example, the service may provide a content item with video content in Italian as specified in the selection parameter when the language identified as in use by the user of the requesting client device is also Italian.

One drawback with selection content items in this manner may be that this approach overlooks the possibility that the user of the requesting client device may be multilingual (e.g., Spanish and Italian). This oversight may be further exacerbated by the fact that many users, including the vast majority of multi-lingual users, do not self-report which languages they use in their account profiles or application settings. Another drawback from this approach may be the significantly low accuracy of identifying other languages used by the user, even when the received query is in a different language. This may be because the text of the query are often short and thus ambiguous given the limited context, with keywords in the query being words potentially in multiple languages. For example, the query containing the keyword "taxi" may be ambiguous, because it is difficult to determine whether the language intended by the user is English or French, or some other language, because all these languages also use the word.

As a result, for such multi-lingual users (e.g., both Spanish and Italian), the set of candidate content items for potential selection may be limited to one of the languages (e.g., either Spanish or Italian), thereby excluding the other language that the user might be comfortable or proficient in. The preclusion of such content item in the other language may lead to a greater consumption of computing and network resources, as the user may make repeated queries to find relevant content. Moreover, the ruling out of content items from other language may also result in lower quality of human-computer interaction (HCI) between the user and the client device, as the content may only be in one language but not in other languages that the user is familiar with.

To tackle these and other technical challenges, the service of the content distribution platform can determine the languages used by the user of the requesting client device based on a mix of various signals of various degrees of quality and coverage. The service can identify the language declared by the user from the account or the application setting, and may also derive the language from the keywords of the query itself. In addition to these factors, the service can construct a user language profile from browsing history of the client device. The service can identify various access activities performed via the client devices as identified in the browsing history. The activities can include, for example, accessing an information resource (e.g., a webpage), entering an input (e.g., comments) on a graphical user interface of the information resource, and previous queries leading to the information resource, among others. With the identification, the service can determine the languages associated with the access activities to build the user language profile. The service can also factor in the language identified from the declaration by the user and from the keywords of the query itself in the user language profile. The user language profile can indicate that the user of the client device is predicted to use one or more languages.

In conjunction, the service can identify languages used by the user of the client device from the search results of the query. In identifying, the service can perform a web search operation using one or more keywords of the query to find a set of information resources with content that match or correlate with the keywords. The web search operation can involve the use or invocation of a search engine with the query, and return the set of information resource as search results. The set of information resources can be ordered in sequence based on a ranking indicating a relevance of the resultant information resource in relation to the keywords of the query. The service can parse each information resource to determine a language from the content on the information resource. The service can narrow the number of languages by factoring in the ranking of the information resource from which the language is derived and the frequency of the determined language among the information resources of the search result.

From the initial set of languages indicated in the constructed user language profile, the service can identify sets of candidate content items for each identified language. Each content item may have a selection parameter indicated that the content item is to be selected when the language determined for user matches the language defined by the content provider. The service can filter the languages in the user profile by identifying an intersection between the set of languages in the user profile and the set of languages determined from the search results. With the filtering of the number of languages predicted for the user, the service can by extension filter the sets of candidate content items eligible to be selected for provision to the client device.

Once the content items are filtered, the service can run a content selection process to select a content item to provide to the client device. This can result in the selection of a content item in a language different from the language declared by the user on the account profile or application settings. For example, the client device that submitted the query can have the account profile set to indicate that the user uses English, but the browsing history can indicate that the user frequently accesses web pages in Polish. From the access history and the search results, the user can be determined to know both English and Polish, and content items in either language can be selected for the pool of eligible content items. From the content selection process, the service can select a content item in either language as well. The content item provided to the client device can be presented with the search results found using the keywords of the query. The provided content item can be in language different from at least some of the search result and same as some other search results.

By using multiple factors in this manner, the accuracy of the languages predicted to be used by the user can be significantly increased, as much as 70-90% in comparison to using only the language declared by the user or derived from the keywords of the query. Furthermore, the set of content items from which to select and provide can be expanded to include multiple languages that are determined with greater accuracy and precision. The inclusion of these content items for selection may lead to a decreased consumption of computing and network resources, with the user making less queries to find relevant content via the client device. Combined with the increase in accuracy of the predicted languages, the addition of the content items across multiple languages can lead to higher quality of HCI, between the user and the client device, as the content may be in any of the languages that the user is determined to know.

Referring now to FIG. 1, depicted is a block diagram depicting one implementation of a computer networked environment or a system 100 for determining languages of users. In overview, the system 100 can include at least one network 105 for communication among the components of the system 100. The system 100 can include at least one data processing system 110 to handle requests communicated via the network 105. The data processing system 110 can include at least one query handler 135, at least one query handler 135, at least one profile deriver 140, at least one search evaluator 145, at least one language assessor 150, and at least one content aggregator 155, among others. The system 100 can include at least one content provider 115 to provide content items. The system 100 can include at least one content publisher 120 to provide information resources (e.g., webpages). The system 100 can include at least one client device 125 to communicate via the network 105. The system 100 can include at least one indexing service 130 (sometimes referred herein as a search engine and web crawler) to find information resources using one or more keywords provided by the client device 125. Each of the components (e.g., the network 105, the data processing system 110 and its components, the content provider 115 and its components, the content publisher 120 and its components, and the client device 125 and its components) of the system 100 can be implemented using the components of a computing system 800 detailed herein in conjunction with FIG. 8.

In further detail, the network 105 of the system 100 can communicatively couple the data processing system 110, the content provider 115, the content publisher 120, and the client devices 125 with one another. The data processing system 110, the content provider 115, and the content publisher 120 of the system 100 each can include a plurality of servers located in at least one data center or server farm communicatively coupled with one another via the network 105. The data processing system 110 can communicate via the network 105 with the content provider 115, the content publisher 120, and the client devices 125. The content provider 115 can communicate via the network 105 with the data processing system 110, the content publisher 120, and the client devices 125. The content publisher 120 can communicate via the network 105 with the data processing system 110, the content publisher 120, and the client devices 125. The client device 125 can communicate via the network 105 with the data processing system 110, the content provider 115, and the content publisher 120.

The content provider 115 can include servers or other computing devices operated by a content provider entity to provide content items for display on information resources at the client device 125. The content provided by the content provider 115 can take any convenient form. For example, the third-party content may include content related to other displayed content and may be, for example, pages of a website that are related to displayed content. The content may include third party content items or creatives (e.g., ads) for display on information resources, such as an information resource including primary content provided by the content publisher 120. The content items can also be displayed on a search results web page. For instance, the content provider 115 can provide or be the source of content items for display in content slots (e.g., inline frame elements) of the information resource, such as a web page of a company where the primary content of the web page is provided by the company, or for display on a search results landing page provided by a search engine. The content items associated with the content provider 115 can be displayed on information resources besides webpages, such as content displayed as part of the execution of an application on a smartphone or other client device 125.

The content publisher 120 can include servers or other computing devices operated by a content publishing entity to provide information resources including primary content for display via the network 105. For instance, the content publisher 120 can include a web page operator who provides primary content for display on the information resource. The information resource can include content other than that provided by the content publisher 120, and the information resource can include content slots configured for the display of content items from the content provider 115. For instance, the content publisher 120 can operate the website of a company and can provide content about that company for display on web pages of the website. The web pages can include content slots configured for the display of content items provided by the content provider 115 or by the content publisher 120 itself. In some implementations, the content publisher 120 can include a search engine computing device (e.g. server) of a search engine operator that operates a search engine website. The primary content of search engine web pages (e.g., a results or landing web page) can include results of a search as well as third party content items displayed in content slots of the information resource such as content items from the content provider 115.

The data processing system 110 can include servers or other computing devices operated by a content placement entity to select or identify content items to insert into the content slots of information resources via the network 105. In some implementations, the data processing system 110 can servers and computing devices operated by a search engine operator. In some implementations, the data processing system 110 can include a content placement system (e.g., an online ad server). The data processing system 110 can maintain an inventory of content items to select from to provide over the network 105 for insertion into content slots of information resources. The inventory may be maintained on a database accessible to the data processing system 110. The content items or identifiers to the content items (e.g., addresses) can be provided by the content provider 115. In some implementations, the data processing system 110 can include a search engine computing device (e.g. server) of a search engine operator that operates a search engine website. The primary content of search engine web pages (e.g., a results or landing web page) can include results of a search as well as third party content items displayed in content slots of the information resource such as content items from the content provider 115.

Each client device 125 can include a computing device to communicate via the network 105 to display data. The displayed data can include the content provided by the content publisher 120 (e.g., the information resource) and the content provided by the content provider 115 (e.g., the content item for display in a content slot of the information resource) as identified by the data processing system 110. The client device 125 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105.

The indexing service 130 can include servers or other computing devices operated by a search engine service to aggregate information resources accessible via the network 105 and to provide search results in response to a query to the client device 125. In some implementations, the indexing service 130 can be a part of the data processing system 110 or the content publisher 120. In some implementations, the functionalities of the indexing service 130 can be distributed across one or more of the data processing system 110, the content provider 120, or the indexing service 130. The primary content of search engine web pages (e.g., a results or landing web page) can include results of a search as well as third party content items displayed in content slots of the information resource such as content items from the content provider 115.

The client device 125 can be operated or used (e.g., using input/output (I/O) devices) by at least one user 160. In some implementations, the user 160 can be associated with the client device 125A (e.g., via an account to login into the client device 125A). The user 160 can be proficient in or can understand multiple languages, such as a first language 165A and a second language 165B (hereinafter generally referred to as language 165). The language 165 can include any natural language, such as English, Spanish, French, German, Mandarin, Hindu-Urdu, Arabic, Russian, Portuguese, Japanese, Korean, Indonesian, and Italian, among others. The language 165 can be represented textually (e.g., using symbols). The user 160 may also be proficient in or understand one language, such as either the first language 165A or the second language 165B.

Figure 2:
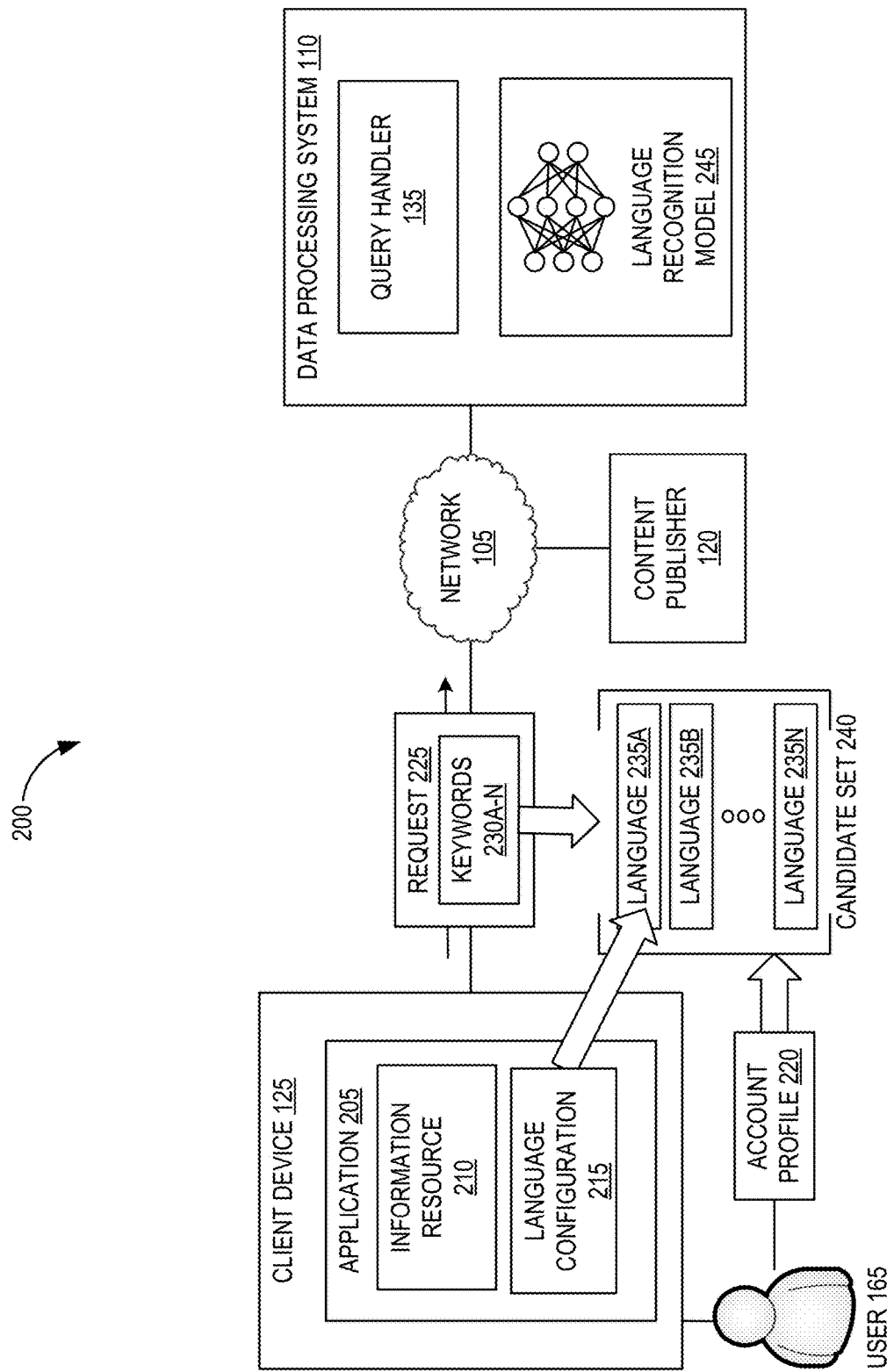
FIG. 2 is a sequence diagram of a query handling process for the system for automatically detecting user language for content selection in accordance with an illustrative embodiment.

Referring now to FIG. 2, depicted is a sequence diagram of a query handling process 200 for the system 100 for automatically detecting user language for content selection. As illustrated, the client device 125 can execute or include at least one application 205. The application 205 can be a program executable on the client device 125 to access resources via the network 105. For example, the application 205 can be a web browser, a web application, a mobile application, or a word processing application, among others. The application 205 may have retrieved or fetched at least one information resource 210 (e.g., a webpage) from the data processing system 110 or the content publisher 120. The information resource 210 can include one or more user interface elements, with which the user 160 can interact via I/O devices of the client device 125 to input. In some implementations, the information resource 210 can correspond to a search engine webpage from the data processing system 110. The search engine webpage can include at least one user interface element (e.g., a textbox) to enter a query for searching content. The input to the user interface elements of the information resource 210 can be in accordance with the first language 210A or the second language 210B.

The application 205 can have or be associated with at least one language configuration 215 (sometimes referred herein as a language setting). The language configuration 215 can define, specify, or otherwise identify one or more languages to be used on the application 205. In accordance with the language configuration 215, the application 205 can send requests for content in the specified language and retrieve one or more information resources (e.g., the information resource 210) in the specified language. For example, the language configuration 215 can specify that the language Portuguese is to be used. In this example, the application 205 can fetch webpages in Portuguese by sending requests for content that indicate that the specify Portuguese. In some implementations, the language configuration 215 for the application 215 can be set to a default language. The default language can be based on a geographic region of the client device 125, a language setting of the client device 125 (e.g., as specified by the operating system (OS)), or pre-configured by the application 205.

In addition, the application 205, the client device 125, or the user 160 can be associated with at least one account profile 220. The account profile 220 can correspond to or be associated with an account with which the user 160 is authenticated to use the client device 125 or the application 205. For example, the user 160 can sign-in using an account identifier and a passcode for the account to sign-in to use the application 205. The account profile 220 can be associated with the user 160 via the account identifier. The account profile 220 can be maintained on the client device 125 or a remote service (e.g., the data processing system 110) accessible via the application 205. The account profile 220 can define, specify, or otherwise identify one or more languages (e.g., via language settings for the account) associated with the user 160 (or the account by extension), the client device 125, or the application 205. As with the language configuration 215, the language specified by the account profile 220 can be used to send request for content and retrieve one or more information resources (e.g., the information resource 210).

The application 205 running on the client device 125 can generate and transmit at least one request 225 for content to the data processing system 110 over the network 105. The generation and transmission of the request 225 can be in response to an input by the user 160 via the application 205 (e.g., a user element) running on the client device 125. The request 225 can identify the account profile 220. In some implementations, the request 225 can include an identifier (e.g., a set of alphanumeric characters in a specified field) referencing the user 160, the associated account, or the account profile 220. In some implementations, the request 225 can include or can correspond to a search query generated via a search engine webpage. For example, the request 225 can be generated upon entry of a query on the search engine webpage loaded on the application 205. In some implementations, the request 225 can include or identify the language configuration 215 associated with the application 205 or the client device 125. For example, the request 225 can include one or more languages indicated by the language configuration 215.

The request 225 can include one or more keywords 230A-N (hereinafter generally referred to as keywords 230). The input for the one or more keywords 230 of the request 225 can be performed via one or more of the I/O devices of the client device 125. The one or more keywords 230 of the query 230 can correspond to or include sets of alphanumeric characters in textual input. In some implementations, the keywords 230 of the query 230 can correspond to the input on an element of the information resource 210 (e.g., a search engine). In some implementations, the input can be an audio input made via a microphone or another form of a transducer for audio input. The one or more keywords 230 of the query 230 can correspond to portions of the audio input corresponding to sets of alphanumeric characters. In some implementations, the application 205 can convert the input audio into sets of alphanumeric characters (e.g., text) to include as keywords 230 of the query 230 using natural language processing (NLP) techniques (e.g., speech recognition). In some implementations, the input audio can be included in the query 230 to be converted to the sets of alphanumeric characters at the data processing system 110.

The query handler 135 executing on the data processing system 110 can retrieve, identify, or otherwise receive the request 225 from the client device 125. Upon receipt, the query handler 135 can parse the query handler 135 to identify the keywords 230. In some implementations, the query handler 135 can extract the text input included or identified in the request 225. Using the extracted text, the query handler 135 can determine or identify the one or more keywords 230. For example, the query handler 135 can group or identify sets of alphanumeric characters separated from one another by a space or a new line as the keywords 230 of the request 225. In some implementations, the query handler 135 can extract the audio input included or identified in the request 225. The query handler 135 can apply a NLP technique (e.g., speech recognition) to identify keywords 230 from one or more portions of the audio input of the request 225. In applying the NLP technique, the query handler 135 can establish, train, and maintain a speech recognition model to apply to audio to identify keywords 230.

Using information associated with or identified by the request 225, the query handler 135 executing on the data processing system 110 can determine or identify candidate languages 235A-N (hereinafter generally referred to the candidate languages 235) for a candidate set 240. The candidate languages 235 can be an estimate, a prediction, or otherwise a determination that the user 160 uses one or more candidate languages 325. The information associated with the request 225 may include the language configuration 215, the account profile 220, and the keywords 230. In some implementations, the query handler 135 can determine or identify the candidate languages 235 based on the language configuration 215 associated with the application 205 or the client device 125. The query handler 135 can parse the request 225 to identify the one or more languages defined by the language configuration 215 as the candidate languages 235. The query handler 135 can add, insert, or include the candidate languages 235 identified from the language configuration 215 to the candidate set 240.

In some implementations, the query handler 135 can determine or identify the set of candidate languages 235 based on the account profile 220. The query handler 135 can parse the request 225 to identify the account profile 220. For example, the query handler 135 can parse the request 225 to extract the account identifier associated with the account profile 220, and can find the account profile 220 associated with the account identifier. From the account profile 220, the query handler 135 can identify one or more languages defined as used by the user 160. The query handler 135 can add, insert, or insert the candidate languages 235 identified from the account profile 220 to the candidate set 240.

In some implementations, at least one language recognition model 245 can be established and maintained by the data processing system 110 to determine the language used in the keywords 230 of the request 225. The language recognition model 245 can be an artificial intelligence (AI) algorithm or a machine learning (ML) model (e.g., an artificial neural network, an n-gram model, a Bayesian network, a random forest, a support vector machine, or a decision tree, among others). In general, the language recognition model 245 can include a set of inputs, a set of outputs, and a set of weights (sometimes herein referred to as parameters) to relate the inputs and the outputs. The inputs can include text (e.g., the keywords 230 extracted from the request 225). The outputs can include or identify a language 235 in which the text is in. In some implementations, the outputs can include also include a likelihood measure indicating a degree of confidence that the text is for each language 235. The weights can be in accordance with the architecture of the AI algorithm or ML model.

The language recognition model 245 can be trained (e.g., by the data processing system 110) using a training dataset. The training can be in accordance with a supervised or unsupervised learning algorithm. The training dataset can include corpuses of text for each language 235 labeled for the corpus. By applying the text from each corpus to the language recognition model 245, a result corresponding to one of the languages 235 may be generated from the language recognition model 245. Based on a comparison of the result with the labeled language for the corpus in the training dataset, an error can be determined. The error can be a mean squared error (MSE), root mean square error (RMSE), or cross entropy error, among others. Using the error the weights of the language recognition model 245 can be adjusted or modified. The updating of the weights of the language recognition model 245 can be repeated until convergence. For example, when the change in the values of the weights is determined to be less than a convergence threshold, the weights of the language recognition model 245 can be determined to have converged. The establishment and training of the language recognition model 245 can be performed prior to receipt of the request 225 from one or more of the client devices 125.

In some implementations, the query handler 135 can identify or determine the candidate languages 235 based on one or more of the keywords 230 of the request 225. The first language 210A can refer to the language used in the keyword 230 of the request 225. To determine, in some implementations, the query handler 135 can apply the language recognition model 245 to the keywords 230 of the request 225. In applying, the query handler 135 can feed the keywords 230 of the request 225 as the input to the language recognition model 245. The query handler 135 can process the input using the weights of the language recognition model 245 to generate or produce an output. The output of the language recognition model 245 can indicate which language 235 the keywords 230 of the request 225 is in. In some implementations, the output can include languages 210 with corresponding likelihood measures. The query handler 135 can identify the language 210 from the output generated by the language recognition model 245. In some implementations, the query handler 135 can identify the language 235 with the highest likelihood measure as calculated by the language recognition model 245. The query handler 135 can add, insert, or the candidate languages 235 determined using the language recognition model 245 to the candidate set 240.

Figure 3:
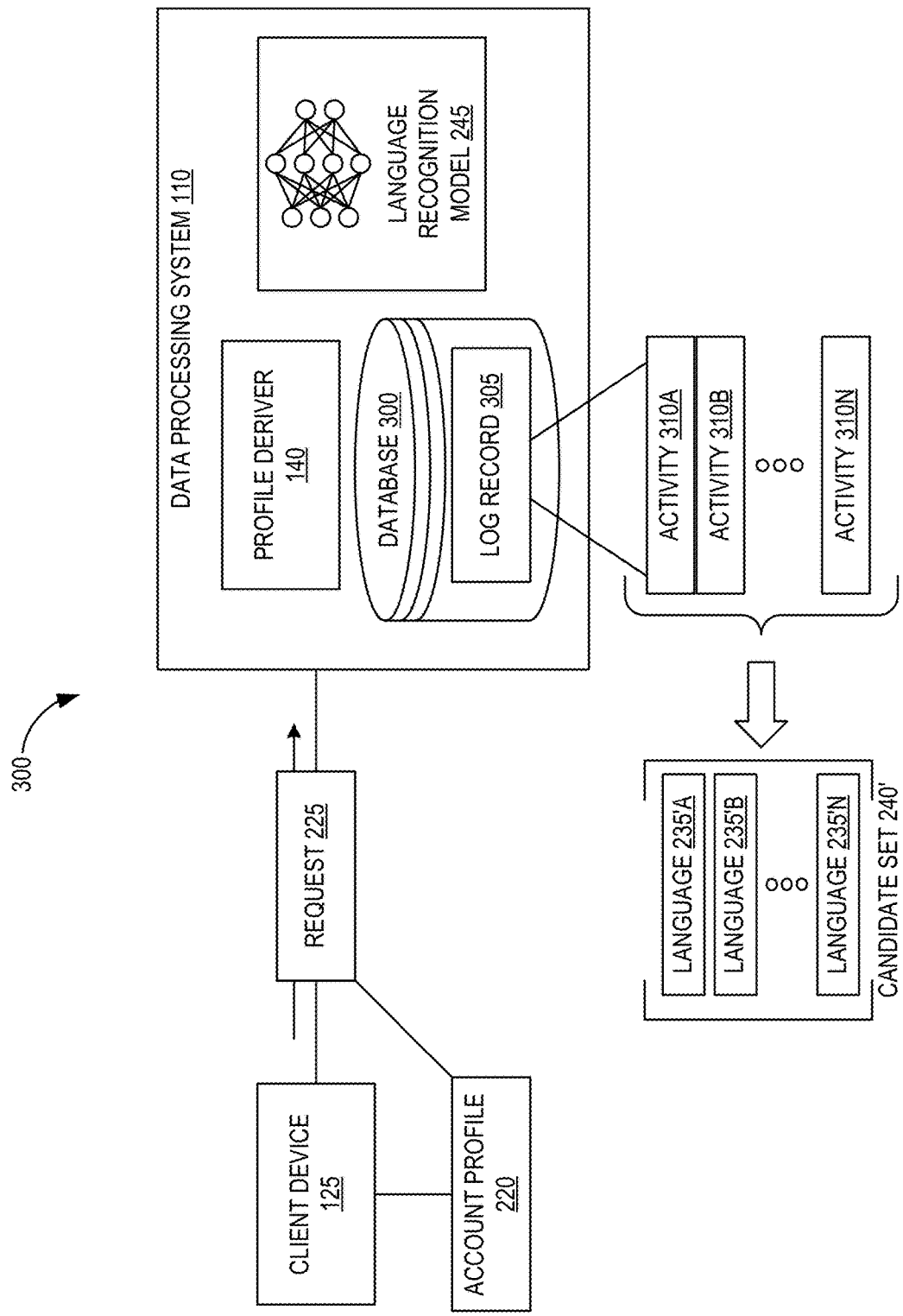
FIG. 3 is a sequence diagram of a language profiling process for the system for automatically detecting user language for content selection in accordance with an illustrative embodiment.

Referring now to FIG. 3, depicted is a sequence diagram of a language profiling process 300 for the system 100 for automatically detecting user language for content selection. As illustrated, from at least one database 330, the profile deriver 140 can select or identify at least one log record 305 for the account profile 220 identified by the request 225. The log record 305 can be maintained and stored on the database 300. The log record 305 include or identify one or more activities 310A-N (hereinafter generally referred to as activities 310). In some implementations, the activities 310 of the log record 305 can be arranged using one or more data structures. For example, the log record 305 can be maintained using a relational database maintained using a database management system (DBMS), and can include an entry for each activity 310 of the log record 305.

The log record 305 can be maintained on the database 300 for a particular client device 125, a particular application 205, or a particular account profile 220 (e.g., as depicted). The activities 310 identified in the log record 305 can correspond to previous actions performed by the client device 125 (or the application 205) associated with the account profile 220 via the network 105. The activities 310 can be also associated with or include content. In some implementations, at least one activity 310 of the log record 305 can include or correspond to a request for content (e.g., a search query) received from the client device 125. For example, the search query including keywords may have been submitted from the client device 125 associated with the account profile 220 to retrieve webpages using the keywords. In some implementations, at least one activity 310 of the log record 305 can include or correspond to accessing of an information resource (e.g., a webpage) by the client device 125. For instance, a cookie may be used to identify webpages accessed by the client device 125 associated with the account profile, and the accessing by the client device 125 can be recorded on the log record 305. In some implementations, at least one activity 310 of the log record 305 can include or correspond to an interaction with an element on the information resource performed via the client device 125. For example, the user 165 associated with the account profile 220 can enter a comment on a webpage, and the comment can be identified by the activity 310 recorded on the log record 305.

Using one or more of the activities 310 of the log record 305, the profile deriver 140 can select, identify, or determine one or more candidate languages 235'A-N (hereinafter generally referred to as candidate languages 235') for a candidate set 240'. In some implementations, the profile deriver 140 can select or identify a subset of activities 310 to use in determining the candidate languages 235' for the candidate set 240'. For example, the profile deriver 140 can select the subset of activities 310 from a time window prior to receipt of the request 225. For each activity 310 identified from the log record 305, the profile deriver 140 can identify or determine the candidate language 235'. In determining, the profile deriver 140 can parse the activity 310 to identify actions performed by the client device 125 (or the application 205) via the network.

With the identification, the profile deriver 140 can identify the content associated with the actions corresponding to the recorded activity 310. The content can include, for example, keywords in the request for content, text on the accessed information resource, and inputs on one or more user interface elements on the information resource, among others. The profile deriver 140 can apply the language recognition model 245 to the content associated with the activity to determine the candidate language 235' in the manner as discussed above. The process of identification of activities 310 and determining candidate languages 235' from the content associated with the activities 310 may be repeated through the log record 305.

For each candidate language 235' identified from the activities 310, the profile deriver 140 can calculate, determine, or otherwise generate a confidence score. The confidence score may indicate a probability or a degree of certainty that the user 165 actually uses the corresponding candidate language 235'. In calculating, the profile deriver 140 can identify a number of occurrences of the candidate language 235' from the activities 310 of the log record 305. In some implementations, the profiler deriver 145 can maintain a counter to track the number of occurrences of the candidate language 235' identified from parsing the activities 310 of the log record 305. Based on the number occurrences, the profile deriver 140 can generate the confidence score. In some implementations, the profile deriver 140 can determine the confidence score using a frequency of occurrences for the corresponding language 235'. The frequency can be based on the number of occurrence for the corresponding candidate language 235' and a total number of occurrences of all the identified candidate languages 235'. In general, the higher the number of occurrences, the higher the confidence score may be. Conversely, the lower the number of occurrences, the lower the confidence score may be for the corresponding candidate language 235'.

Using the confidence scores, the profile deriver 140 can determine whether to add or include the candidate language 235' in the candidate set 240'. In some implementations, the profile deriver 140 can select the candidate languages 235' corresponding to the N highest confidence scores to include to the candidate set 240'. In some implementations, the profile deriver 140 can compare the confidence scores of the corresponding candidate languages 235' to a threshold score to determine whether to include to the candidate set 240'. The threshold score can delineate or demarcate a value for the confidence score at which the corresponding candidate language 235' to include to the candidate set 240'. When the confidence score satisfies (e.g., greater than or equal to) the threshold score, the profile deriver 140 can select the corresponding candidate language 235' to include to the candidate set 240'. On the other hand, when the confidence score satisfies (e.g., less than) the threshold score, the profile deriver 140 can select the corresponding candidate language 235' to include to the candidate set 240'.

Figure 4:
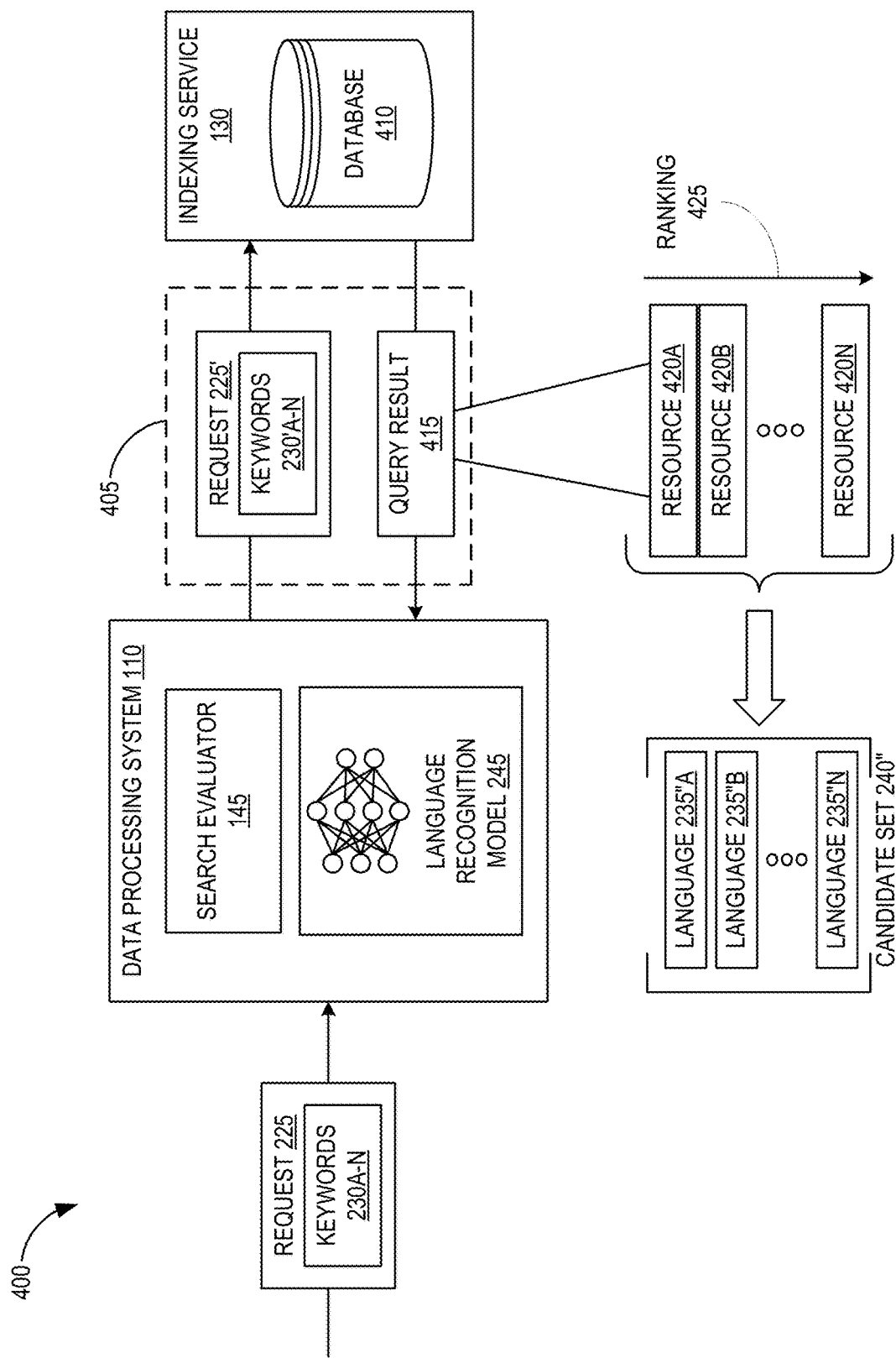
FIG. 4 is a sequence diagram of a results evaluation process for the system for automatically detecting user language for content selection in accordance with an illustrative embodiment.

Referring now to FIG. 4, depicted is a sequence diagram of a results evaluation process 400 for the system 100 for automatically detecting user language for content selection. As illustrated, the search evaluator 145 executing on the data processing system 110 can carry out, execute, or otherwise perform at least one search operation 405 using the keywords 230 of the request 225 to identify at least one query result 410. To perform the search operation 405, the search evaluator 145 can invoke the indexing service 130 using the keywords of the keywords 230 of the request 225. In some implementations, the search evaluator 145 can send or provide the keywords 230 by forwarding a request 230' (also referred herein as a query). The request 230' can include at least a subset of the keywords 230 of the original request 230. In some implementations, the search evaluator 145 can generate and send the request 225' including the keywords 230 of the original request 225 to provide to the indexing service 130.

The indexing service 130 can aggregate one or more information resources (e.g., webpages) accessible via the network 105 (e.g., the Internet). In some implementations, the indexing service 130 can carry out or perform an indexing process (also referred herein as web indexing or spidering) through the network 105 to identify the information resources 420A-N (hereinafter generally referred to as information resources 420). Each information resource 420 can be uniquely identified or referenced by an identifier (e.g., a Uniform Resource Locator (URL)). In addition, each information resource 420 can include content (e.g., textual or audiovisual) and can be associated with metadata. The indexing service 130 can parse each identified information resource 420 to extract or identify at least a portion of the content included in the information resource 420 and the metadata associated with the information resource 420. With the identification, the indexing service 130 can maintain and store the identifier of the information resource 420, at least the portion of the content, and the metadata on the database 410.

Upon receipt, the indexing service 130 can parse the request 225' (or the request 225) to extract or identify the one or more keywords 230'. Using the keywords 230', the indexing service 130 can identify one or more information resources 420. In some implementations, the indexing service 130 can use the keywords 230' to search the database 410 to find one or more of the information resources 420 aggregated via the indexing process. In identifying, the indexing service 130 can compare the keywords 230' from the request 225' with the content or metadata of the information resources 420. In some implementations, the indexing service 130 may use or apply natural language processing (NLP) processes to compare the keywords 230' against the content or metadata of the information resources 420.

For example, the indexing service 130 may use a semantic knowledge graph to generate additional words and phrases with semantic similarity (e.g., synonyms) as the keywords 230' of the request 225'. The indexing service 130 can then use the additional keywords or phrases to match against the content or metadata of the information resources 420. Based on the comparison, the indexing service 130 can determine whether the at least a portion of the content or metadata of the information resource 420 matches or corresponds to one or more of the keywords 230'. In some implementations, the indexing service 130 can determine that the information resource 420 includes content or metadata that matches the keywords 230' or the additional, associated words and phrases.

In accordance with the determination, the indexing service 130 can generate at least one query result 415 to provide to the search evaluator 145. The query result 415 can include or identify one or more information resources 420 determined to have content or metadata that match or correspond to the keywords 230' of the request 225'. When the content or metadata of the information resource 402 is determined to not match or correspond to any of the keywords 230', the indexing service 130 can exclude the information resource 420 from the query result 415. Conversely, when the content or metadata of the information resource 420 is determined to match or correspond to the keywords 230', the indexing service 130 can add or include the information resource 420 to the search query 415.

With the identification of one or more information resources 420 to include, the indexing service 130 can determine or generate at least one ranking 425 for the query result 415. The ranking 425 may specify, define, or identify a degree of relevance of the information resources 420 in relation to the keywords 230' of the request 225'. The ranking 425 can also identify an order in which the information resources 420 (or the identifiers for the information resources 420) are to be presented (e.g., on a search results page). In determining, the indexing service 130 can calculate, determine, or generate a relevance score for each identified information resource 420. The calculation of the relevance score may be based on a number of occurrences of the keywords 230' in the content or metadata of the information resource 420. Based on the relevance scores of the identified information resources 420, the indexing service 130 can determine the ranking 425. In general, the higher the relevance score is for a given information resource 420 in the query result 415, the higher the information resource 420 may be in terms of ranking 425. In contrast, the lower the relevance score is for a given information resource 420 in the query result 415, the lower the information resource 420 may be in terms of ranking 425. With the generation, the indexing service 130 can send or provide the query result 415 to the search evaluator 145.

From the search operation 405, the search evaluator 145 can identify the information resources 420 ordered in accordance with the ranking 425. In some implementations, the search evaluator 145 can parse the query result 415 received from the indexing service 130 to identify the information resources 420 and the ranking 425. Based on the information resources 420 and the ranking 425, the search evaluator 145 can select, identify, or determine one or more candidate languages 235"A-N (hereinafter generally referred to as candidate languages 235") for a candidate set 240". For each information resource 420, the search evaluator 145 can identify or determine the candidate language 235" in which the information resource 420 is in. The search evaluator 145 can parse the information resource 420 to extract or identify at least a portion of the content. The search evaluator 145 can apply the language recognition model 245 to the content of the information resource 420 to determine the candidate language 235" in the manner as discussed above. The process of identifying the information resources 420 and the candidate languages 235" may be repeated through the query result 415.

In some implementations, the search evaluator 145 can use the candidate set 240' in arranging and generating the candidate set 240". The search evaluator 145 can use the candidate languages 235' in the candidate set 240' as the initial set of candidate languages 235" for the candidate set 240". When a candidate language 235' is determined to be in one or more of the information resources 240 of the query result 415, the search evaluator 145 can maintain the candidate language 235' from the candidate set 240". Otherwise, when a candidate language 235' is determined to not be found in any of the information resources 240 of the query result 415, the search evaluator 145 can remove the candidate language 235' from the candidate set 240".

For each candidate language 235" identified from the information resources 420, the search evaluator 145 can calculate, determine, or otherwise generate a confidence score. The confidence score may indicate a probability or a degree of certainty that the user 165 actually uses the corresponding candidate language 235". In calculating, the search evaluator 145 can identify a number of occurrences of the candidate language 235" from the information resources 420 of the query result 415. In some implementations, the search evaluator 145 can maintain a counter to track the number of occurrences of the candidate language 235" identified from parsing the information resources 420 of the query result 415. In addition, the search evaluator 145 can identify one or more orders of the information resources 420 identified as in the candidate language 235" from the ranking 425. As discussed above, the ranking 425 can indicate a degree of relevance of the information resource 420 to the keywords 230 and can identify the order of the information resource 420 within the query result 415.

Based on the number occurrences and the orders identified form the ranking 425 for the information resources 420, the search evaluator 145 can generate the confidence score for each candidate language 235". In some implementations, the search evaluator 145 can determine the confidence score using a frequency of occurrences for the corresponding language 235". The frequency can be based on the number of occurrence for the corresponding candidate language 235" and a total number of occurrences of all the identified candidate languages 235". In general, the higher the number of occurrences and the higher orders in the ranking 425, the higher the confidence score for the candidate language 235" may be. Conversely, the lower the number of occurrences and the lower orders in the rankings 425, the lower the confidence score may be for the corresponding candidate language 235".

Using the confidence scores, the search evaluator 145 can determine whether to add or include the candidate language 235" in the candidate set 240". In some implementations, the search evaluator 145 can select the candidate languages 235" corresponding to the N highest confidence scores to include to the candidate set 240". In some implementations, the search evaluator 145 can compare the confidence scores of the corresponding candidate languages 235" to a threshold score to determine whether to include to the candidate set 240". The threshold score can delineate or demarcate a value for the confidence score at which the corresponding candidate language 235" to include to the candidate set 240". When the confidence score satisfies (e.g., greater than or equal to) the threshold score, the search evaluator 145 can select the corresponding candidate language 235" to include to the candidate set 240". On the other hand, when the confidence score satisfies (e.g., less than) the threshold score, the search evaluator 145 can select the corresponding candidate language 235" to include to the candidate set 240".

Figure 5:
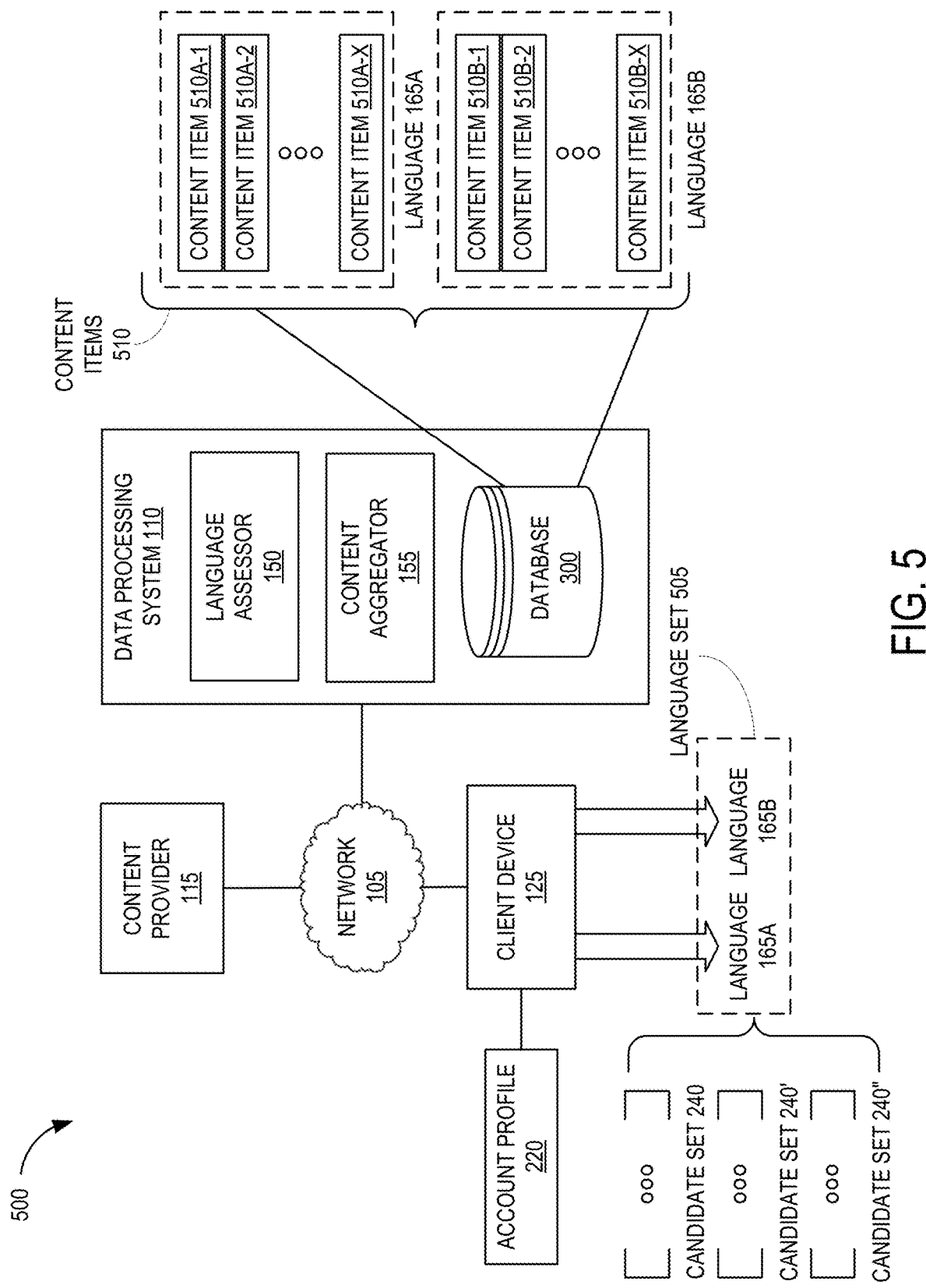
FIG. 5 is a sequence diagram of content selection process for the system for automatically detecting user language for content selection in accordance with an illustrative embodiment.

Referring now to FIG. 5, depicted is a sequence diagram of content selection process 500 for the system 100 for automatically detecting user language for content selection. As illustrated, the language assessor 150 executing on the data processing system 110 can determine or identify one or more languages (e.g., languages 165A and 165B) of a language set 505 as used by the user 160 from the candidate languages 235, 235', 235" of the candidate sets 240, 240', 240". In some implementations, the language assessor 150 can omit the candidate set 240 (and the candidate languages 235) from the determination. In some implementations, the language assessor 150 can determine or identify an intersection among the candidate sets 240, 240', 240" to identify common candidate languages 235, 235', 235". The language assessor 150 can identify or determine one or more of the candidate languages 235, 235, 235" as common when found in all of the candidate sets 240, 240', 240". In contrast, the language assessor 150 can identify or determine one or more of the candidate languages 235, 235, 235" as not common when found less than all of the candidate sets 240, 240', 240". Based on the intersection, the language assessor 150 can determine or identify the common candidate languages 235, 235', 235" as the languages as used by the user 160 for the language set 505.

The language assessor 150 can associate the identify languages (e.g., languages 165A and 165B as depicted) of the language set 505 with the account profile 220. The language assessor 150 can also store and maintain the association of the account profile 220 with the one or more languages of the language set 505 onto the database 300. The association may be in one or more data structures (e.g., linked list, array, tree, entry on a DMBS) stored and maintained on the database 300. Conversely, the language assessor 150 can also determine or identify candidate languages 235, 235', 235" outside the intersection among the candidate sets 240, 240', 240" as not used by the user 160 associated with the client device 125. In some implementations, the language assessor 150 can identify the languages outside the intersection as not associated with the account profile 220. The language assessor 150 can also store and maintain the lack of association of the account profile 220 onto the database 300. The association may be in one or more data structures (e.g., linked list, array, tree, entry on a DMBS) stored and maintained on the database 300.

The content aggregator 155 executing on the data processing system 110 can maintain a set of content items 510 from one or more content providers 115 on the database 300 (or a separate database). Each content item 510 can correspond to or include a text, an image, audio, video, or multimedia content to be presented via the client device 125. The content item 510 can correspond to or include an object to be inserted on an information resource (e.g., the information resource 210). The object can be, for example, an inline frame, a text object, an image, an audio object, a canvas object, or a video object, among others, in accordance with HTML5. Each content item 510 can be referenced by an identifier, such as a URL or another set of alphanumeric characters, among others.

In some implementations, the content aggregator 155 can retrieve, identify, or receive the content items 510 themselves from the content providers 115 via the network 105. Upon receipt, the content aggregator 155 can store and maintain the content items 510 on the database 300. In some implementations, the content aggregator 155 can retrieve, identify, or receive identifiers for the content items 510 from the content providers 115. An identifier for the content item 510 can reference or correspond to a location of content item 510 stored or maintained by the content provider 115, and can be for example, a URL or another set of alphanumeric characters, among others. Upon receipt, the content aggregator 155 can store and maintain the identifiers for the content items 510 on the database 300.

The content items 510 can include content in one or more languages 165 (e.g., the first language 165A and the second language 165B as depicted). For example, as depicted, the content items 510 can include content items 510A-1 to 510A-X in the first language 165A (hereinafter generally referred to as content items 510A). The content items 510 can also include content items 510B-1 to 510B-X in the second language 165B (hereinafter generally referred to as content items 510B). Each content item 510 can be associated with at least one selection criterion. The selection criterion can specify, define, or identify parameters in accordance to which the associated content item 510 is to be selected as a candidate for provision to the client device 125. For instance, the content item 510 can include text and images for a football by company "XYZ." In this example, the associated selection criterion 510 can specify that the client device 125 is to have previously accessed information resources (e.g., webpages) that contain content related to football or the company. The parameters of the selection criterion can include account segment, geographic region, and device type, among others. The selection criterion can be configured or set by the content provider 115 that provided the content item 510 to the data processing system 110.

In some implementations, the identification of the content item 510 as in one language can be provided by the content provider 115. For instance, when submitting the content item 510 to the data processing system 110, the content provider 115 can send an indication labeling the language 165 of the content item 510 (e.g., as one of the first language 165A or the second language 165B). In some implementations, the identification of content items 510 as in one language 165 can be performed by the language evaluator 140 in the manner described above. For example, upon receipt of the content item 510, the content aggregator 155 can apply the language recognition model 305 to the content of the content item 510 to determine the language of the content item 510.

In some implementations, the content aggregator 155 can verify or determine that the language of the content item 510 is the same language of an associated information resource. The information resource can be associated via a link included in the content item 510. For example, the associated information resource can be a landing page of the content item 510. To verify, the content aggregator 155 can identify the information resource associated with the content item 510 (e.g., via the link). The content aggregator 155 can compare the language in which the content item 510 is in with the language in which the associated information resource is in. The content aggregator 155 can determine the language of the content item 510 by applying the language recognition model 245 to the content item 510. Furthermore, the content aggregator 155 can determine the language of the associated information resource by applying the language recognition model 245 to the information resource. When the languages is determined to match or correspond, the content aggregator 155 can include or add the content item 510 into a candidate set for the respective language. Otherwise, when the languages is determined to not match or correspond, the content aggregator 155 can exclude the content item 510 from a candidate set for the respective language.

Figure 6:
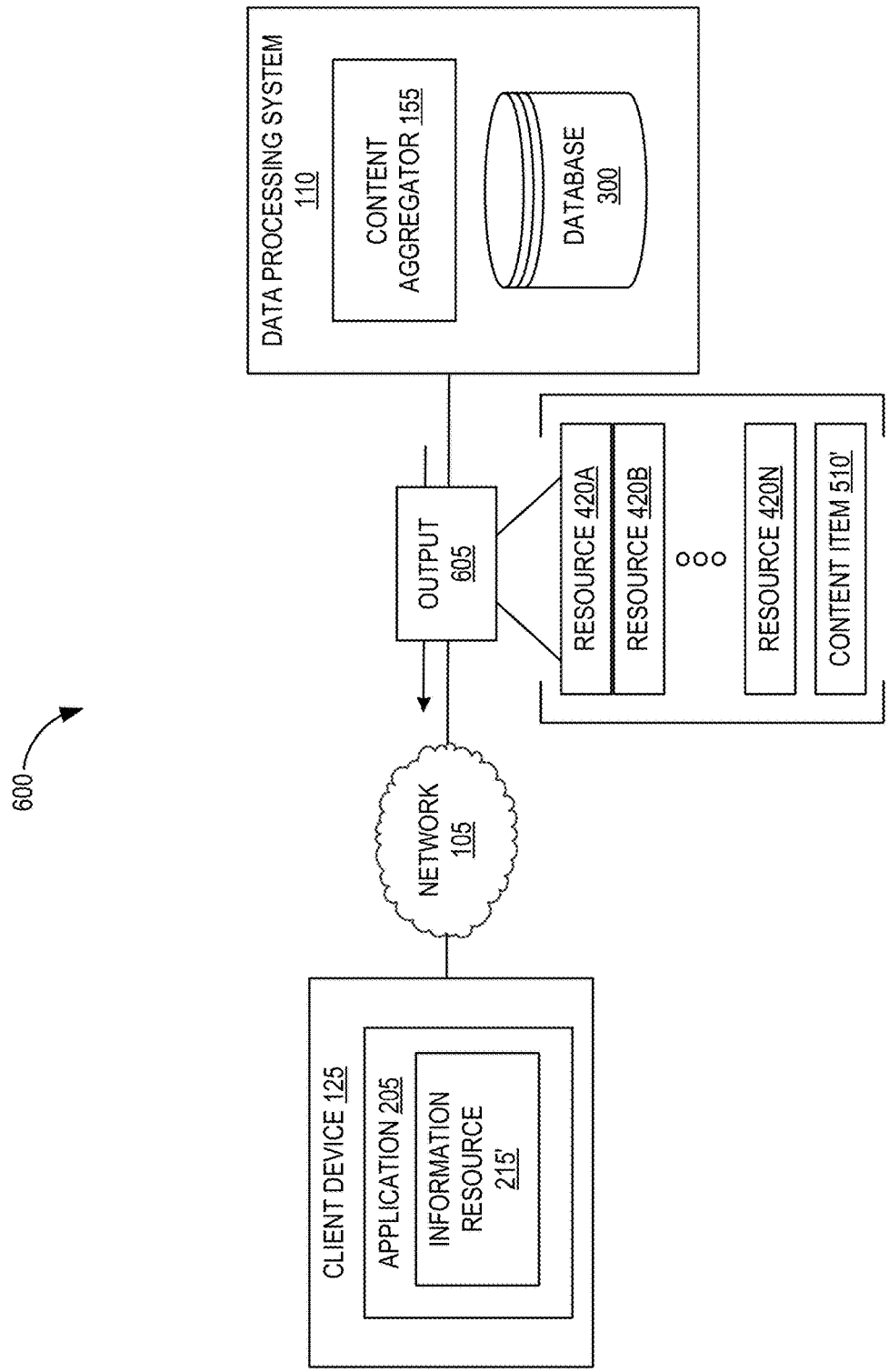
FIG. 6 is a sequence diagram of a results provision process for the system for automatically detecting user language for content selection in accordance with an illustrative embodiment.

Referring now to FIG. 6, depicted is sequence diagram of a results provision process 600 for the system 100 for automatically detecting user language for content selection. As illustrated, the content aggregator 155 can identify or select at least one content item 510' to provide to the client device 125. The selection of the content item 510' can be from the set of content items 510A in the first language 165A and the set of content items 510B in the second language 165B. In some implementations, the content aggregator 155 can generate, determine, or identify a selection value for each identified content item 510. The selection value may be used to identify the at least one content item 510' to provide to the client device 125 for presentation. The determination of the selection value for the content item 510 can be based on a comparison between the request 225 and the selection criterion of the content item 510. For example, the content aggregator 155 can determine the selection value by comparing the keywords 230 in the request, segment of the account profile 202, and device type and location of the client device 125, among others, against the selection criterion of the content item 510 to determine the selection value.

Using the selection values of the content items 510, the content aggregator 155 can select the content item 510' from the set of content items 510A in the first language 165A and the set of content items 510B in the second language 165B. In some implementations, the content aggregator 155 can select the content item 510' corresponding to the highest selection value. In some implementations, the content aggregator 155 can select the content item 510' in accordance with a content selection protocol. The content selection protocol can include, for example, a real-time bidding protocol and a header bidding protocol, among others. The operations of the content selection protocol can be distributed among the data processing system 110, the content provider 115, and the client device 125. In performing the content selection protocol, the content aggregator 155 can retrieve, identify, or receive a submission value (e.g., a bid value) from each content provider 115 with a content item 510 in the candidate set 515A or 515B. In some implementations, the content aggregator 155 can combine the submission value with the selection value of the content item 510 of the content provider 115 to modify or determine the selection value. Upon combination, the content aggregator 155 can identify or select the content item 510 corresponding to the highest selection value to use as the selected content item 510'. The selected content item 510' can be from the candidate set in the first language 210A or the candidate set in the second language 210B.

With the selection, the content aggregator 155 can send, transmit, or provide the content item 510' to the client device 125. In some implementations, the content aggregator 155 can provide the content item 510' with the information resources 420 identified from the search operation 405 (or identifiers for the information resources 420). The provision of the content item 510' and the information resources 420 can be via at least one output 605. The application 205 can receive the content item 510' sent from the data processing system 110 via the network 105. Upon receipt, the application 205 can present the content item 510' on an information resource 215'. In some implementations, the application 205 r can present the information resources 420 on the information resource 215' in accordance with the ranking 425. For example, the information resource 215' can be a search results page, and can present corresponding identifiers for the information resources 420 along with the content item 510'.

In this manner, the system 100 can improve the overall functionalities of the data processing system 110 and the client device 125. By determining that the user 160 of the client device 125 is capable of understanding multiple languages 165A and 165B in an objective fashion, the candidate sets 515A and 515B can be expanded to include content items in these languages 165A and 165B. In the end, the content item 510' selected from the candidate sets 515A and 515B can be in either language 165A or 165B, and can be provided for presentation to the user 160 operating the client device 125A. As a result, the information resource 220' can be in the first language 165A, while the content item 510' inserted into the content slot 610 can be in the second language 165B. The inclusion of content in multiple languages 165A and 165B can reduce the consumption of computing resources at both the client device 125 and the data processing system 110, by eliminating the requisite of providing separate queries for content in those languages 165. Furthermore, the human-computer interaction (HCI) between the user 160 and the system 100 may be enhanced with the presentation of content in potentially multiple languages 165.

Figure 7:
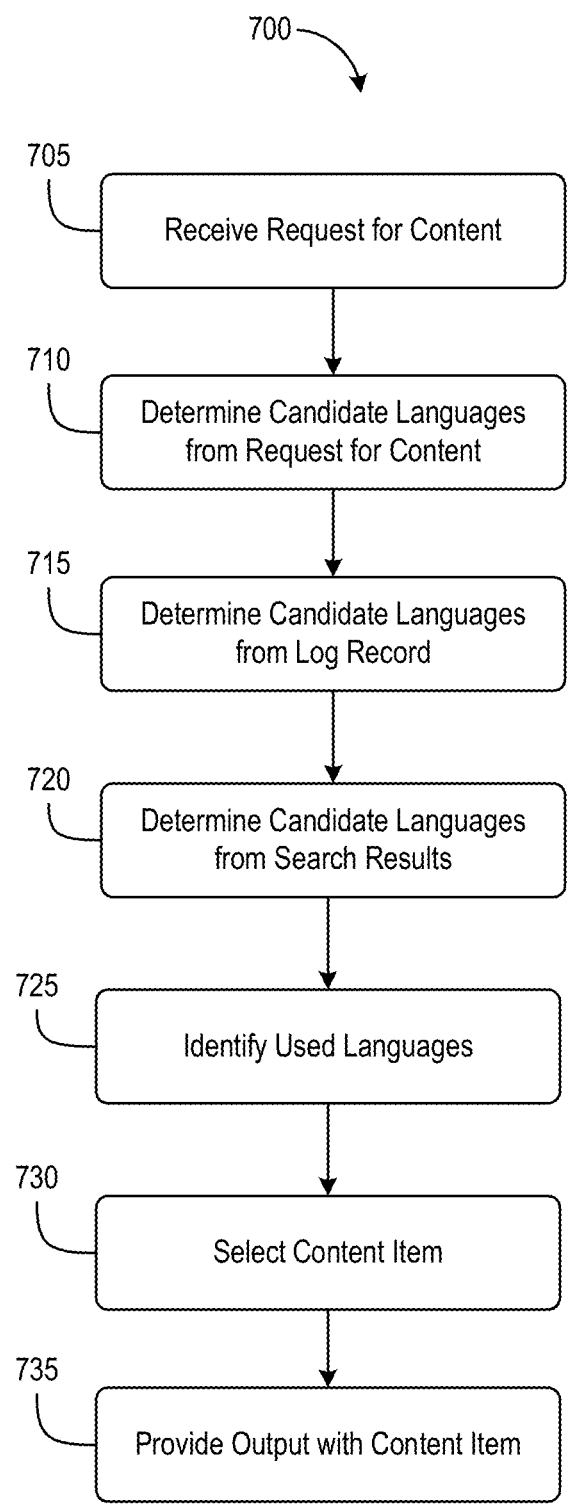
FIG. 7 is a flow diagram of a method of automatically detecting user language for content selection in accordance with an illustrative embodiment.

Referring now to FIG. 7, depicted is a flow diagram of a method 700 of automatically detecting user language for content selection. The method 700 can be implemented using or performed by any of the components detailed herein in conjunction with FIGS. 1-6 and 8. The method 700 can also include the actions, operations, and functionalities of any of the components detailed herein in conjunction with FIGS. 1-6 and 8. In brief overview, a data processing system can receive a request for content (705). The data processing system can determine candidate languages from the request for content (710). The data processing system can determine candidate languages from a log record (715). The data processing system can determine candidate languages from search results (720). The data processing system can identify used languages (725). The data processing system can select a content item (730). The data processing system provide an output with the content item (735).

In further detail, a data processing system (e.g., the data processing system 110) can receive a request for content (e.g., the request 225) (705). The request for content can include one or more keywords (e.g., the keywords 235) from a client device (e.g., the client device 125). The keywords can be part of a search query, and can be used to identify indexed information resources. The request can identify or be associated with an account profile (e.g., the account profile 220).

The data processing system can determine candidate languages (e.g., the candidate languages 235) from the request for content (710). The data processing system can parse the request to identify a language configuration of the client device or a language setting of the account profile. In addition, the data processing system can identify the language in which the keyword is in using a model (e.g., the language recognition model 245). From the parsing, the data processing system can identify candidate language to include to a candidate set (e.g., the candidate set 240).

The data processing system can determine candidate languages (e.g., the candidate languages 235') from a log record (e.g., the log record 305) (715). The data processing system can identify one or more activities maintained on the log record for the client device or account profile. For each identified activity, the data processing system can identify associated content. The data processing system can determine the language in which the content associated with the activities are by applying the model. The data processing system can add candidate language to a candidate set (e.g., the candidate set 240').

The data processing system can determine candidate languages from search results (e.g., query result 415) (720). Using the keywords of the request for content, the data processing system can perform a search operation (e.g., the search operation 405). From the search operation, the data processing system can identify one or more indexed information resources (e.g., the information resource 420). The data processing system can apply a model to determine the language in which the information resource is in. The data processing system can add candidate language to a candidate set (e.g., the candidate set 240").

The data processing system can identify used languages (e.g., the languages 165A and 165B) (725). The data processing system can determine an intersection among the candidate set of languages. The intersection can include one or more languages common across the candidate sets. Using the intersection, the data processing system can identify the languages as used by the client device.

The data processing system can select a content item (e.g., the content item 510') (730). The content item can be in one of the languages identified as used by the client device. The data processing system can identify the content item in accordance with a content selection protocol. The data processing system can provide an output (e.g., the output 605) with the content item (735). The output can include the selected content item along with the indexed information resources.

Figure 8:
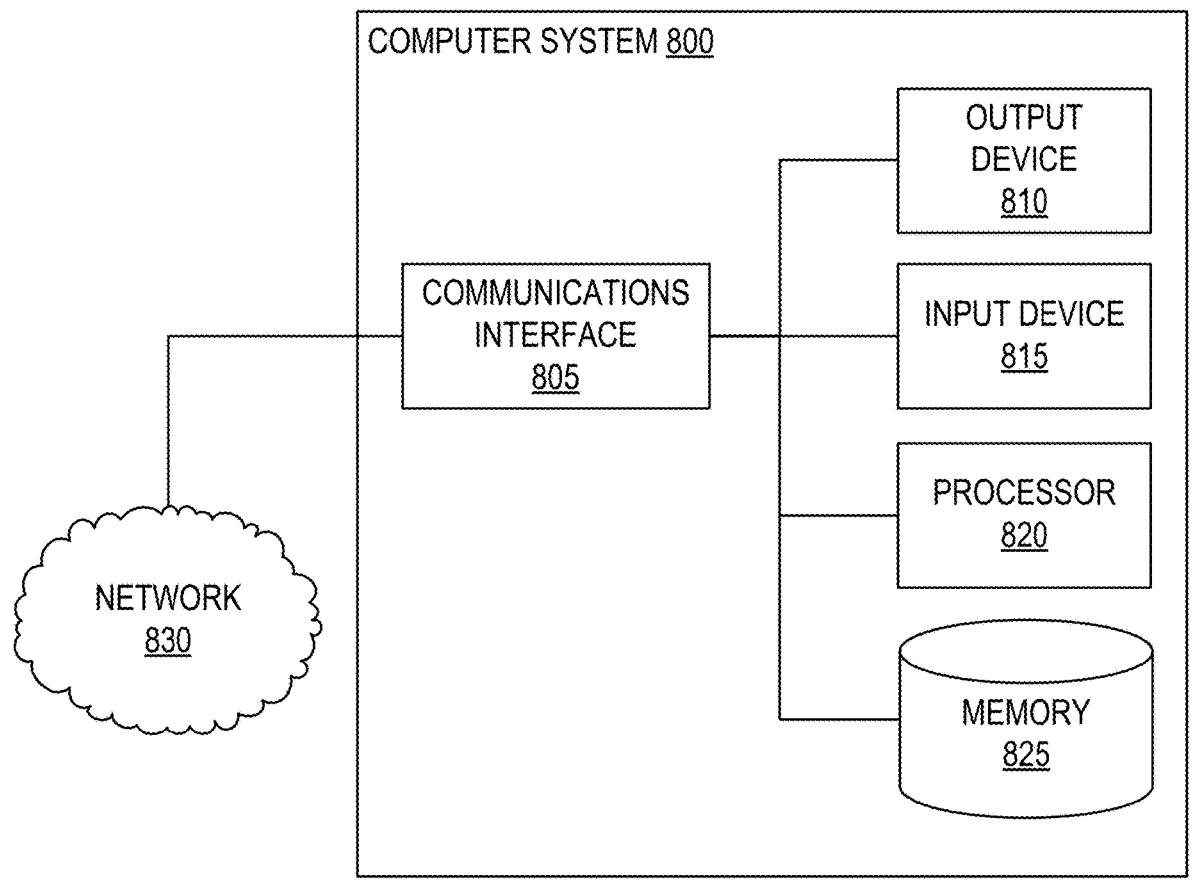
FIG. 8 is a block diagram illustrating a general architecture for a computer system that may be employed to implement elements of the systems and methods described and illustrated herein, according to an illustrative implementation.

Referring now to FIG. 8, illustrated is the general architecture of an illustrative computer system 800 that may be employed to implement any of the computer systems discussed herein (including the data processing system 110 and its components, the content provider 115, the content publisher 120, and the client device 125) in accordance with some implementations. The computer system 800 can be used to provide information via the network 830 for display. The computer system 800 comprises one or more processors 820 communicatively coupled to memory 825, one or more communications interfaces 805 communicatively coupled with at least one network 830 (e.g., the network 105), and one or more output devices 810 (e.g., one or more display units) and one or more input devices 815.

The processor 820 can include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory 825 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). The memory 825 can include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The processor(s) 820 shown in FIG. 8 may be used to execute instructions stored in the memory 825 and, in so doing, also may read from or write to the memory various information processed and or generated pursuant to execution of the instructions. The processors 820 coupled with memory 825 (collectively referred herein as a processing unit) can be included in the components of the system 100, such as the data processing system 110 (and also the content provider 115, the content publisher 120, the client device 125, and the indexing service 130). For example, the data processing system 110 can include the memory 825 as the database 240. The processors 820 coupled with memory 825 (collectively referred herein as a processing unit) can be included in the content provider 115. For example, the content provider 115 can include the memory 825 to store the content items 505 or 505'. The processors 820 coupled with memory 825 (collectively referred herein as a processing unit) can be included in the content publisher 120. For example, the content publisher 120 can include the memory 825 to store the information resource 210. The processors 820 coupled with memory 825 (collectively referred herein as a processing unit) can be included in the client device 125.

The processor 820 of the computer system 800 also may be communicatively coupled to or made to control the communications interface(s) 805 to transmit or receive various information pursuant to execution of instructions. For example, the communications interface(s) 805 may be coupled to a wired or wireless network, bus, or other communication means and may therefore allow the computer system 800 to transmit information to or receive information from other devices (e.g., other computer systems). While not shown explicitly in the system of FIGS. 1-6, one or more communications interfaces facilitate information flow between the components of the system 800. In some implementations, the communications interface(s) may be configured (e.g., via various hardware components or software components) to provide a website as an access portal to at least some aspects of the computer system 800. Examples of communications interfaces 805 include user interfaces (e.g., the application 215, the information resource 220 or 220', and content item 505 or 505'), through which the user can communicate with other devices of the system 100.

The output devices 810 of the computer system 800 shown in FIG. 8 may be provided, for example, to allow various information to be viewed or otherwise perceived in connection with execution of the instructions. The input device(s) 815 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

The network 830 can include computer networks such as the internet, local, wide, metro or other area networks, intranets, satellite networks, other computer networks such as voice or data mobile phone communication networks, and combinations thereof. The network 830 may be any form of computer network that relays information among the components of the system 100, such as the data processing system 110 and its components, the content provider 115, the content publisher 120, the client device 125, and the indexing service 130. For example, the network 830 may include the Internet and/or other types of data networks, such as a local area network (LAN), a wide area network (WAN), a cellular network, satellite network, or other types of data networks. The network 830 may also include any number of computing devices (e.g., computer, servers, routers, network switches, etc.) that are configured to receive and/or transmit data within network 830. The network 830 may further include any number of hardwired and/or wireless connections. The client device 125 may communicate wirelessly (e.g., via WiFi, cellular, radio, etc.) with a transceiver that is hardwired (e.g., via a fiber optic cable, a CAT5 cable, etc.) to other computing devices in network 830.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable a receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, or other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In some implementations, the features may be implemented on a laptop computer or other personal computer, a smartphone, other mobile phone, handheld computer, a tablet PC, or other computing device. In some implementations, the features disclosed herein may be implemented on a wearable device or component (e.g., smart watch) which may include a processing module configured to integrate internet connectivity (e.g., with another computing device or the network 830).

The operations described in this specification can be implemented as operations performed by a data processing apparatus on data stored on one or more computer-readable storage devices or on data received from other sources. The terms "data processing apparatus", "data processing system", "user device" or "computing device" encompasses all kinds of apparatuses, devices, and machines for processing data, including by way of example a programmable processor, a computer, a system on a chip or multiple chips, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from read-only memory or random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can include any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 800 or system 100 can include clients and servers. For example, the data processing system 110 and its components, the content provider 115, the content publisher 120, the client device 125, and the indexing service 130 of the system 100 can each include one or more servers in one or more data centers or server farms. A client (e.g., the client device 125) and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the query handler 135, the profile deriver 140, the search evaluator 145, the language assessor 150, and the content aggregator 155 can be part of the data processing system 110, a single module, a logic device having one or more processing modules, or one or more servers.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by the content server.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to selecting content to provide in networked environments, the systems and methods described herein can include applied to other environments. The foregoing implementations are illustrative rather than limiting of the described systems and methods. The scope of the systems and methods described herein is thus indicated by the appended claims, rather than the foregoing description, and changes that come within the meaning and range of equivalency of the claims are embraced therein.

What is claimed is:

1. A method, comprising:
receiving, by a data processing system having one or more processors, from a client device, a request for content identifying an account profile;
determining, by the data processing system using a log record identifying a browsing history of the account profile, a first set of candidate languages from a plurality of languages by analyzing the log record using a language recognition model, wherein the language recognition model is trained according to a training dataset including corpuses of text for each language of the plurality of languages by:
applying each of the corpuses of text for each language of the plurality of languages to the training dataset to generate a set of results corresponding to result languages of the plurality of languages,
generating a result error by comparing each of the result languages to a labeled language for each of the corpuses, and
modifying one or more weights of the language recognition model based on the result error;
determining, by the data processing system, a second set of candidate languages from the plurality of languages based on a language setting of the account profile;
identifying, by the data processing system, a set of languages included in both the first set of candidate languages and the second set of candidate languages, the set of languages including a first language and a second language from the plurality of the languages; and
storing, by the data processing system in one or more data structures, an association among the account profile, the first language, and the second language.

2. The method of claim 1, further comprising:
generating, by the data processing system, a first confidence score for the first language based on a first number of occurrences of the first language in at least one of the browsing history or the language setting of the account profile; and
generating, by the data processing system, a second confidence score for the second language based on a second number of occurrences of the second language in at least one of the browsing history or the language setting of the account profile.

3. The method of claim 1, further comprising:
including, by the data processing system, the first language into the first set of candidate languages responsive to determining that a first confidence score for the first language is greater than a threshold score; and
including, by the data processing system, the second language into the second set of candidate languages responsive to determining that a second confidence score for the second language is greater than the threshold score.

4. The method of claim 1, further comprising:
identifying, by the data processing system, a first plurality of content items in the first language and a second plurality of content items in the second language; and
providing, by the data processing system to the client device, a content item selected from one of the first plurality of content items and the second plurality of content items, the content item in one of the first language or the second language.

5. The method of claim 1, further comprising:
identifying, by the data processing system, a selection value for each content item of a first plurality of content items in the first language and a second plurality of content items in the second language; and
selecting, by the data processing system from the first plurality of content items and the second plurality of content items, a content item to provide to the client device in accordance to a content selection protocol, the content item in one of the first language or the second language.

6. The method of claim 1, further comprising:
identifying, by the data processing system, an information resource associated with a content item in the first language or the second language;
determining, by the data processing system, that a language of the content item corresponds to a language of the information resource; and
adding, by the data processing system responsive to determining that the language of the content item corresponds to the language of the information resource, the content item to a plurality of candidate content items to select from for the client device.

7. The method of claim 1, further comprising:
identifying, by the data processing system, a third set of candidate languages from at least one of: (i) content in each information resource of a plurality of information resources identified in response to a request for content and a corresponding ranking of each information resource, (ii) a language configuration of an application executing on the client device, or (iii) one or more keywords included in the request for content; and
wherein identifying the set of languages further comprises identifying the set of languages included in the first set of candidate languages, the second set of candidate languages, and the third set of candidate languages.

8. The method of claim 1, wherein determining the first set of candidate languages further comprises determining from the plurality of languages based on the browsing history identified in the log record, the browsing history including at least one of: a search query received from the client device, accessing of an information resource by the client device, and interaction with an element on information resource.

9. The method of claim 7, wherein determining the third set of candidate languages further comprises determining from the plurality of languages based on a frequency of each language of the third set of candidate languages across the plurality of information resources identified in response to the request for content.

10. The method of claim 1, wherein receiving the request for content further comprises receiving a query including one or more keywords; and further comprising:
performing a search operation using the one or more keywords of the query to identify a plurality of information resources; and
providing, by the data processing system to the client device, an output including at least one of the plurality of information resources and a content item selected from one of a first plurality of content items in the first language and a second plurality of content items in the second language, the content item in one of the first language or the second language.

11. A system, comprising:
a data processing system having one or more processors coupled with memory, configured to:
receive, from a client device, a request for content identifying an account profile;
determine, using a log record identifying a browsing history of the account profile, a first set of candidate languages from a plurality of languages by analyzing the log record using a language recognition model, wherein the language recognition model is trained according to a training dataset including corpuses of text for each language of the plurality of languages by:

applying each of the corpuses of text for each language of the plurality of languages to the training dataset to generate a set of results corresponding to result languages of the plurality of languages, generating a result error by comparing each of the result languages to a labeled language for each of the corpuses, and modifying one or more weights of the language recognition model based on the result error;

determine a second set of candidate languages from the plurality of languages based on a language setting of the account profile;

identify a set of languages included in both the first set of candidate languages and the second set of candidate languages, the set of languages including a first language and a second language from the plurality of the languages; and store, in one or more data structures, an association among the account profile, the first language, and the second language.

12. The system of claim 11, wherein the data processing system is further configured to:

generate a first confidence score for the first language based on a first number of occurrences of the first language in at least one of the browsing history or the language setting of the account profile; and generate a second confidence score for the second language based on a second number of occurrences of the second language in at least one of the browsing history or the language setting of the account profile.

13. The system of claim 11, wherein the data processing system is further configured to:

include the first language into the first set of candidate languages responsive to determining that a first confidence score for the first language is greater than a threshold score; and include the second language into the second set of candidate languages responsive to determining that a second confidence score for the second language is greater than the threshold score.

14. The system of claim 11, wherein the data processing system is further configured to:

identify a first plurality of content items in the first language and a second plurality of content items in the second language; and provide, to the client device, a content item selected from one of the first plurality of content items and the second plurality of content items, the content item in one of the first language or the second language.

15. The system of claim 11, wherein the data processing system is further configured to:

identify a selection value for each content item of a first plurality of content items in the first language and a second plurality of content items in the second language; and select, from the first plurality of content items and the second plurality of content items, a content item to provide to the client device in accordance to a content selection protocol, the content item in one of the first language or the second language.

16. The system of claim 11, wherein the data processing system is further configured to:

identify an information resource associated with a content item in the first language or the second language;

determine that a language of the content item corresponds to a language of the information resource; and add, responsive to determining that the language of the content item corresponds to the language of the information resource, the content item to a plurality of candidate content items to select from for the client device.

17. The system of claim 11, wherein the data processing system is further configured to:

identify a third set of candidate languages from at least one of: (i) content in each information resource of a plurality of information resources identified in response to a request for content and a corresponding ranking of each information resource, (ii) a language configuration of an application executing on the client device, or (iii) one or more keywords included in the request for content; and identify the set of languages included in the first set of candidate languages, the second set of candidate languages, and third set of candidate languages.

18. The system of claim 11, wherein the data processing system is further configured to determine, from the plurality of languages based on the browsing history identified in the log record, the browsing history including at least one of: a search query received from the client device, accessing of an information resource by the client device, and interaction with an element on information resource.

19. The system of claim 17, wherein the data processing system is further configured to determine, from the plurality of languages based on a frequency of each language of the third set of candidate languages across the plurality of information resources identified in response to the request for content.

20. The system of claim 11, wherein the data processing system is further configured to:

receive, from the client device, a query including one or more keywords;

perform a search operation using the one or more keywords of the query to identify a plurality of information resources; and provide, to the client device, an output including at least one of the plurality of information resources and a content item selected from one of a first plurality of content items in the first language and a second plurality of content items in the second language, the content item in one of the first language or the second language.

21. The system of claim 11, wherein analyzing the log record using the language recognition model includes:

applying each of the corpuses of text for each language of the plurality of languages to an entry of the log record; and generating a language result of the first set of candidate languages corresponding to the entry of the log record.

22. The system of claim 11, wherein the language recognition model is at least one of: (i) an artificial neural network, (ii) an n-gram model, (iii) a Bayesian network, (iv) a random forest model, (v) a support vector machine, or (vi) a decision tree model.

* * * * *